April 25, 1933.  S. A. STAEGE  1,905,250
MEANS FOR TAKING-UP SLACK
Filed April 11, 1929
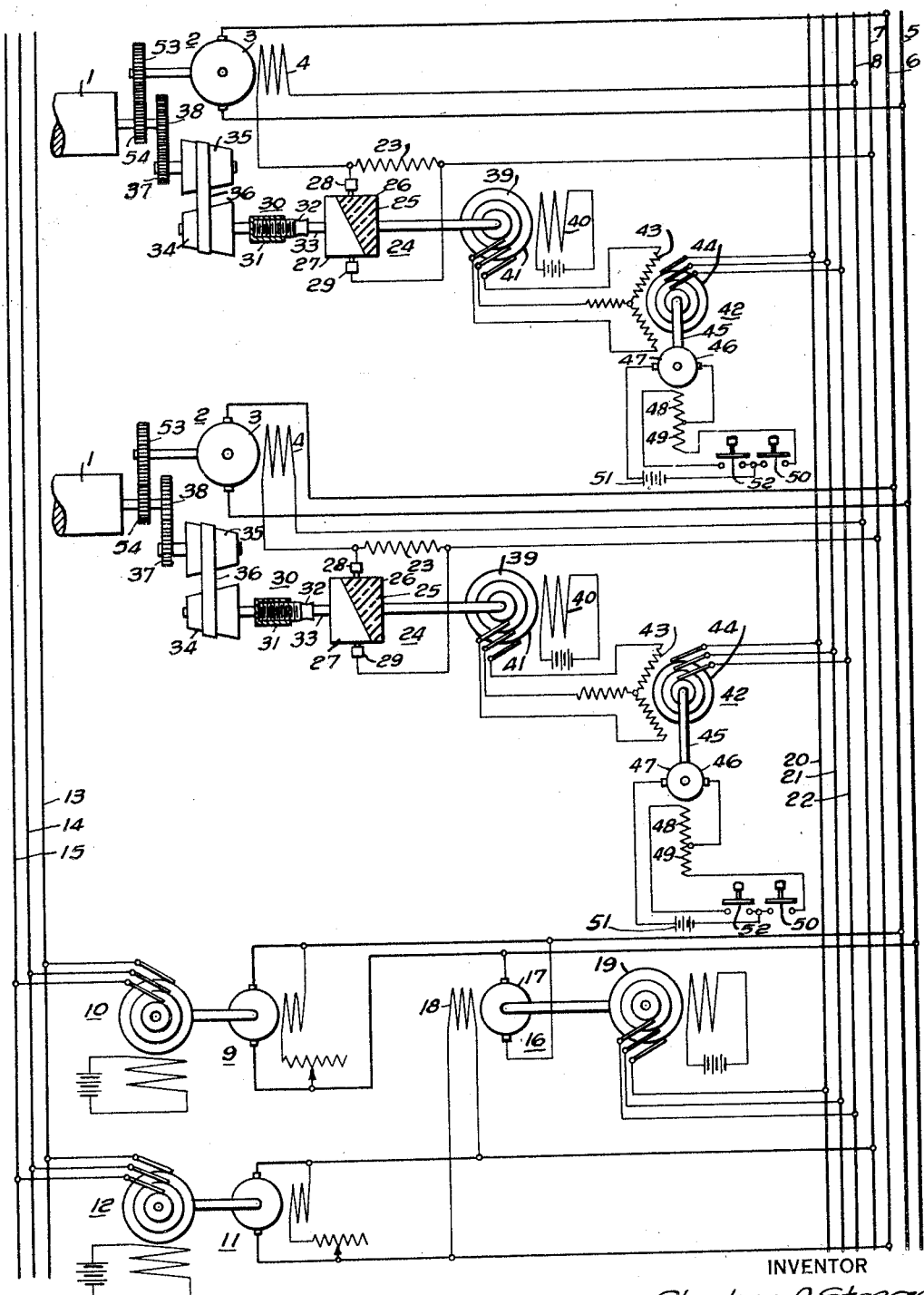
INVENTOR
Stephen A. Staege.
BY
ATTORNEY Patented Apr. 25, 1933

1,905,250

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

MEANS FOR TAKING UP SLACK

Application filed April 11, 1929. Serial No. 354,382.

My invention relates to sectional electrical drives for machines having a plurality of rotating members that are required to run in a predetermined speed relationship, such, for example, as the rolls of a paper-making machine or the like and it has special relation to means for taking up any slack in the sheet of material occurring between the rolls, especially when the sheet is taken over the machine.

The usual paper-making machine comprises a plurality of rolls operated in sections. The several sections are frequently driven by separate section-driving motors, and the desired relative speeds of the several sections are maintained for a given paper-making operation by the use of sectional speed regulators.

The raw material or stock is supplied to one end of the machine, known as the "wet end", where it is formed into a thin sheet, while in a plastic or moistened state. The sheet thus formed is conveyed through the succeeding rolls where the moisture is removed, partly by pressing and partly by passing the sheet between heated rolls constituting a dryer section of the machine. From the dryer section, the paper passes to one or more calender sections where the paper is calendered prior to its being wound upon a reel.

Frequently, there is considerable slack in the sheet of paper, between the dryer section and the calender section, between the two calender sections, or between a calender section and the reel when the paper is started through the machine. The normal operation of the machine is such that considerable time is often lost in taking up the slack. Unless the slack is removed, wrinkles are frequently formed in the paper, resulting in paper "cuts" and other breaks.

An object of my invention is to provide means for taking up any slack which may occur between the rolls or sections of a machine of the character described.

My invention may best be understood by referring to the accompanying drawing, in which the single figure is a schematic view of apparatus and circuits employed in one embodiment of my invention.

Referring to the drawing, two sections of the paper-making machine are shown. The sections shown are not necessarily adjacent ones but are located at various places in the paper-making machine where it is desired to take up any slack that may occur between successive rolls. This is usually between two calender sections or between a dryer and a calender section or between a calender section and a reel.

A plurality of paper rolls 1 are driven, through gear wheels 53 and 54, by their respective direct-current section motors 2. Each of the section motors 2 is provided with an armature winding 3 and a field winding 4. The armature windings of the several section motors are connected to adjustable-voltage direct-current supply conductors 5—6 that are supplied with energy from any suitable source, such as a generator 9 driven by a synchronous motor 10. The field-winding circuit of each motor is connected to constant-potential direct-current supply conductors 7 and 8 that are supplied with energy from the generator 11, driven by a synchronous motor 12. The energy for operating synchronous motors 10 and 12, is supplied from three phase alternating-current supply conductors 13, 14 and 15.

A direct-current motor 16 is provided, having an armature winding 17 and a field winding 18 which are connected to the supply conductors 5—6 and the supply conductors 7—8, respectively, or similarly to the corresponding windings of the section driving motors 2. The motor 16 drives an alternating-current generator 19 which supplies a variable-frequency three-phase current to conductors 20, 21 and 22 and acts as a master motor to determine the speed of the entire machine.

A resistor 23 is provided in series-circuit relation with the field winding of each of the section motors 2, and a rotary contactor 24 is associated with each resistor to intermittently close a circuit in shunt-circuit relation thereto and thereby vary the effective value of said resistor in accordance with the angular position of one member of a differential device with respect to the other member.

Each rotary contactor comprises a drum 25, having tapered non-conducting and conducting surface portions 26 and 27, respectively, that are adapted to engage brushes 28 and 29 which are connected to the associated resistor 23. The resistor 23 will be short circuited for a greater or lesser part of each rotation of the drum 25, depending upon the position of the brushes. The relative position of the brushes and the drum depends upon the axial position of the rotary contactor drum which is controlled by the operation of the associated differential device 30.

Each differential device 30 comprises nut-and-screw engaging members 31 and 32, respectively; one of which is so connected by means of shaft 33 to the rotary contactor drum 25 as to slide it along its axis in accordance with the operation of the differential device. One member 31 of the differential device is connected by means of cone pulleys 34 and 35, the cooperating belt 36, and gear wheels 37 and 38, to be operated in accordance with the speed of its associated section motor 2. The other member 32 of the differential device is connected to be operated in accordance with the speed of an associated synchronous motor 39.

The details of construction and operation of the rotary-contactor-regulating device constitute the subject matter of my copending application, Serial No. 743,578, filed October 14, 1924, and assigned to the Westinghouse Electric & Manufacturing Company.

The several synchronous motors 39 are each provided with a direct-current field winding 40 and an alternating-current armature winding 41, the several armature windings being connected, by means of conductors 20, 21 and 22, to the generator 19 to run in synchronism therewith. In order to temporarily vary the synchronous relation between a motor 39 and the generator 19, I provide a frequency changer 42 or wound-rotor induction motor between the armature 41 of the synchronous motor 39 and the conductors 20, 21 and 22. One winding 43 of such machine is connected to the winding 41, and the other winding 44 is connected to the variable-frequency, three-phase alternating-current supply conductors 20, 21 and 22.

A direct-current motor 46 is connected to the rotor of the induction motor 42 by the shaft 45. This motor is provided with an armature winding 47 and two field windings 48 and 49, so wound as to produce rotation in opposite directions. The armature winding 47 and one of the field windings 48 or 49 may be connected to a source of electrical energy 51 by means of push-button switches 50 or 52, respectively.

The operation of my system is as follows: When the speeds of the two members of the differential device are equal, there is no movement of one member relative to the other. If, however, there is a difference of speed, the member 32 changes its position axially relative to member 31, and the position of the contactor drum is thereby changed. Under normal operation of the paper machine sections, the speeds of both members of the differential device are equal, and there is a correct amount of resistance in series-circuit relation with the field winding of the section motor to maintain the motor at the proper speed.

If it is desired to speed up or slow down one section motor with respect to the remaining motors, this may be done by suitably varying the position of the belt 36 upon the cone pulleys 34 and 35. This variation temporarily affects one member of the differential device 30 only, causing the rotary contactor 24 to vary the effective value of the resistor 33 and thus changing the speed of the motor 2 sufficiently to bring the two sides of the differential to the same speed.

When a change of speed of the entire paper machine is desired, it may be made by changing the voltage of the generator 9, thereby changing the voltage of the energy supply for the section motors 2, and also to the master motor 16. This changes the frequency of the current supplied to the synchonous motors 39 by the generator 19.

Since the master motor 16 is connected in parallel-circuit relation to the motors 2, a change in the frequency of the current supplied to the synchronous motors 39 is substantially proportional to the change in speed of the section motors 2, by reason of the equivalent change in the voltage impressed upon the motor armatures. The effective value of the resistor 23, therefore, may be substantially the same, regardless of the speed at which the system is operated.

During the normal operation of the system, the frequency changer 42 is stationary and acts as a transformer to reproduce the frequency of the line upon the synchronous-motor armature winding. However, when slack exists between two calender sections or between a dryer and a calender section or between a calender section and the reel, the rotor of the frequency changer may be rotated by the operation of the push-button switch 50 temporarily impressing upon the synchronous-motor-armature winding a frequency higher than the frequency of the generator 19. This causes the calender section to temporarily operate at a speed slightly different from normal to thereby change the phase relation between the sections.

The frequency changer 42 may be actuated by a direct-current motor 46 that is controlled by push-button switches 50 and 52 to operate in the one or in the other direction. As long as the rotor of the frequency changer continues to operate in a certain direction, the calender section runs at a higher speed and continues to do so until all the slack is taken up, when the button is released.

If tension on the paper becomes too great, and there is danger that it may break, the other button 52 may be pressed to cause the rotor of the frequency changer to rotate in the opposite direction. This causes a frequency lower than that of the supply conductors 20, 21, 22 to be impressed upon the synchronous-motor-aramture winding, with a resulting diminution of speed of the calender section. This may be continued until the tension is reduced to a safe operating condition.

While I have described my system as applied to a paper-making machine, it will be apparent that it may be utilized with many systems having sectional motor drives and having the motors operating at a predetermined speed ratio.

The accompanying description and illustration are merely illustrative, since many modifications, within the spirit and scope of my invention, may occur to those skilled in art. Therefore, I do not wish to be limited otherwise than by the scope of the appended claims.

I claim as my invention:

1. In a paper making machine, or the like, wherein a plurality of machine sections are required to operate in a desired speed harmony, said machine sections comprising a plurality of rotatable members, a plurality of direct-current motors for driving said members, a synchronous motor associated with each machine section for regulating the speed of said section and to maintain a predetermined speed harmony between said members, and means for taking up slack between said machine sections comprising means for temporarily accelerating or temporarily decelerating certain of said synchronous motors.

2. In a paper making machine, or the like, wherein a plurality of machine sections are required to operate in a desired speed harmony, a plurality of direct-current motors for driving said machine sections, regulator means for each of said motors for causing the motors to run in predetermined speed harmony, said regulator means including a plurality of synchronous motors operating normally at the same frequency, and means for taking up slack between said machine sections comprising means for temporarily altering the frequency applied to a selected one of said synchronous motors with respect to the frequency applied to the other synchronous motors.

3. In a paper making machine, or the like, wherein a plurality of machine sections are required to operate in a desired speed harmony, said machine sections comprising a plurality of rotatable members, a plurality of direct-current motors for driving said members, regulator means for maintaining a predetermined speed ratio between said motors, said regulating means including a plurality of synchronously operated motors, and means for taking up slack between said machine sections comprising means for temporarily varying the synchronous relation between certain of said motors.

4. In a system of motor drives for a machine comprising a plurality of machine sections through which a continuous strip of material passes, said machine sections comprising a plurality of rotatable members, a plurality of direct-current motors for driving said machine sections, regulator means for maintaining a predetermined speed ratio between said motors, said regulating means including a plurality of synchronous motors, an alternating-current supply circuit for supplying energy to said synchronous motors, the frequency of which determines the speed of the several direct-current motors, and means for temporarily impressing a frequency on certain of said synchronous motors that differs from that of the supply circuit to take up slack between said machine sections, said means comprising controlled frequency changers interposed between certain of said synchronous motors and the supply circuit.

5. In a system of motor drives for a machine comprising a plurality of machine sections through which a continuous strip of flexible material passes, said machine sections comprising a plurality of rotatable members, a plurality of direct-current motors for driving said machine sections, regulator means for maintaining a predetermined speed ratio between said motors, said regulating means including a plurality of differential devices and associated synchronous motors, an alternating-current supply circuit to which said synchronous motors are connected, means for taking up slack between said machine sections, comprising frequency changers interposed between certain of said synchronous motors and their supply circuit, and means for actuating said frequency changers to impress a frequency on their associated synchronous motors different from that of the alternating-current circuit.

6. In a system of motor drives for a machine comprising a plurality of machine sections through which a continuous strip of flexible material passes, a plurality of direct-current motors for driving said machine sections, regulator means for each of said motors, said regulator means including a pilot synchronous motor the speed of which determines the speed of the associated direct-current motor, an alternating-current supply circuit for supplying the pilot motors and causing the direct-current motors to run in predetermined speed harmony, means for taking up slack between said machine sections, comprising frequency changers interposed between certain of said pilot synchronous motors and the supply circuit for temporarily varying the frequency of the current supplied to the pilot motor from that of the current taken from the supply circuit.

7. In a system of motor drives for operating a machine having a plurality of rotatable members through which a sheet of thin material is passed, a plurality of direct-current motors for driving said members, a regulator unit associated with each direct-current motor and including a pilot motor, means for simultaneously actuating said several pilot motors to maintain a predetermined speed ratio between said direct-current motors, and means for temporarily modifying the action of selected regulator units to temporarily vary the speed of the associated direct-current motors from the predetermined relation to thereby remove the slack in said sheet between adjacent members.

In testimony whereof, I have hereunto subscribed my name this 4th day of April 1929.

STEPHEN A. STAEGE.